M. J. COLEMAN.
ELEVATOR.

No. 184,228. Patented Nov. 14, 1876.

Witnesses
W. J. Cambridge
J. E. Cambridge

Inventor,
Michael J. Coleman
per Feshemacher & Stearns

UNITED STATES PATENT OFFICE.

MICHAEL J. COLEMAN, OF BOSTON, MASSACHUSETTS.

IMPROVEMENT IN ELEVATORS.

Specification forming part of Letters Patent No. 184,228, dated November 14, 1876; application filed October 7, 1876.

*To all whom it may concern:*

Be it known that I, MICHAEL J. COLEMAN, of Boston, in the county of Suffolk and State of Massachusetts, have invented an Improvement in Elevators, of which the following is a full, clear, and exact description, reference being had to the accompanying drawings, making part of this specification, in which—

Figure 1:
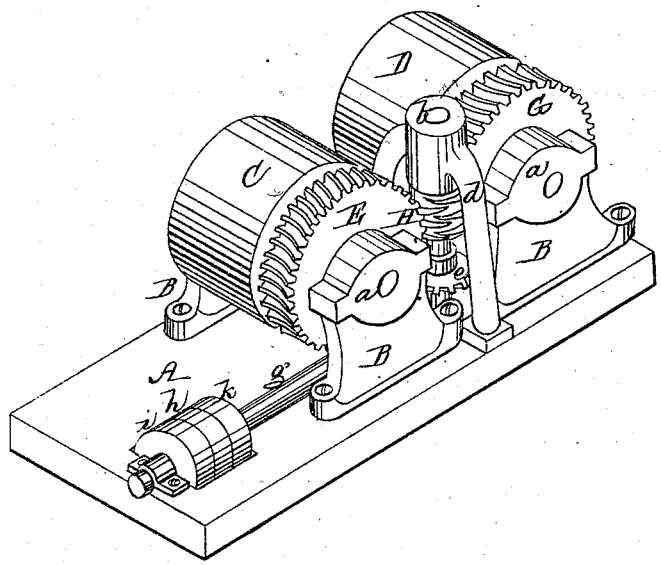
Figure 3:
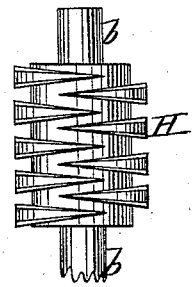
Figure 2:
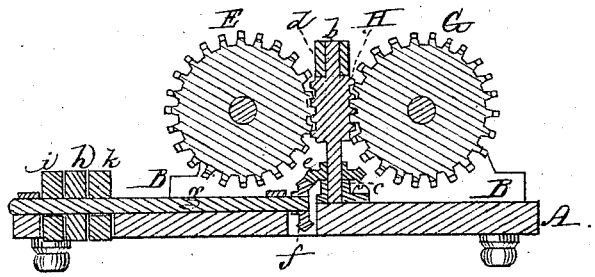

Figure 1 is a perspective view of the hoisting-drums of an elevator, with their driving mechanism, constructed in accordance with my invention. Fig. 2 is a vertical longitudinal section through the center of the driving mechanism. Fig. 3 is an elevation, enlarged, of the worm which I employ.

Elevators have been constructed in which the hoisting-drums were driven by a single worm engaging with a worm-gear; but this method is objectionable on account of the "end thrust" imparted to the worm-shaft, which caused undue wear of the parts. To overcome this difficulty, a shaft has been employed having two worms, one with a right-hand and the other with a left-hand thread, which engaged with two worm-gears on the shafts of the hoisting-drums, the two worms acting in opposite directions, so that the force exerted by one on its worm-gear counterbalanced that exerted by the other worm on the other worm-gear, thereby avoiding the "end thrust" and the objections incident thereto. The tendency of the worm-shaft to be forced away from the gears, however, caused undue pressure and consequent increased friction of the ends of the shaft within their bearings, and when this shaft was worn, it was expensive to replace.

To overcome all of the above-mentioned objections is the purpose of my invention, which consists in a worm provided with right and left hand threads, intersecting each other, in combination with, and arranged between, the two worm-gears of the hoisting-drums, this worm driving both gears simultaneously, whereby the friction is reduced to a minimum and the cost of repairs materially diminished.

To enable others skilled in the art to understand and use my invention, I will proceed to describe the manner in which I have carried it out.

In the said drawings, A is the bed, from which rise the standards B in suitable bearings *a*, in which run the shafts of the hoisting-drums C D, these shafts also carrying two worm-gears, E G, which are driven by the worm H, placed centrally between them, the shaft *b* of this worm having its lower bearing in a step, *c*, secured to the bed A, and its upper bearing in the top of a bifurcated support, *d*, rising from the bed. This worm is provided with a right-hand thread, and also with a left-hand thread, these two threads intersecting each other and forming what is usually denominated a "diamond screw." This worm acts simultaneously upon the two worm-gears E G, the right-hand thread engaging with and driving one of the gears, and the left-hand thread engaging with and driving the other gear, and, as the two forces exerted act in opposite directions, they counterbalance each other, and the "end thrust" upon the shaft of the worm is entirely avoided, while at the same time the tendency of one gear to force the worm laterally away from its periphery is counterbalanced by the tendency of the other gear to force the worm laterally in the opposite direction, and consequently, as there is no lateral pressure of the journals of the worm-shaft against their bearings, the friction is reduced to a minimum, while the mechanism is more compact and less liable to get out of order than heretofore. Furthermore, when the worm H becomes worn, it can be removed with its shaft *b*, and another substituted therefor at a much less cost that the long shaft provided with two separate worms heretofore used.

To the lower end of the worm-shaft *b* is secured a bevel-gear, *e*, which engages with another bevel-gear, *f*, on a horizontal shaft, *g*, provided near one end with a fast pulley, *h*, and two loose pulleys, *i k*, for belts running in opposite directions, and by means of suitable shippers the shaft *g* and worm-shaft $b$ connected therewith can be revolved in either direction, according as it is desired to raise or lower the elevator.

What I claim as my invention, and desire to secure by Letters Patent is—

The worm H, provided with right and left hand threads, intersecting each other, in combination with, and arranged between, the worm-gears E G of the hoisting-drums of an elevator, so as to drive them simultaneously, substantially as and for the purpose set forth.

Witness my hand this 28th day of September, 1876.

MICHAEL J. COLEMAN.

In presence of—
P. E. TESCHEMACHER,
GEO. P. JOHNSON.